Patented Jan. 26, 1932

1,842,970

UNITED STATES PATENT OFFICE

ALMON G. HOVEY, OF SCOTIA, NEW YORK, ASSIGNOR TO GENERAL ELECTRIC COMPANY, A CORPORATION OF NEW YORK

ELECTRICAL APPARATUS

No Drawing.  Application filed July 25, 1931. Serial No. 553,217.

The present invention relates to electrical apparatus and is concerned with the insulation of electrical conductors in such apparatus. More specifically it is concerned with the provision in a novel manner of inorganic insulation on electrical conductors.

It is well known that inorganic insulation on electrical conductors, for example the coils of motors and generators, transformers and the like, is highly desirable for the reason that such insulation is more heat resistant, less liable to attack by chemical agents, and permits of the production of a more compact unit than does organic insulation.

It has been recognized that one of the major obstacles in the way of the utilization of inorganic insulation has been the lack of flexibility of such insulation. Consequently, there has been great difficulty in applying the insulation to conductors in such a manner that it would not flake or chip off during winding of a coil, for example.

In accordance with my invention it is proposed to provide electrical conductors with inorganic insulation before the conductors are wound into coils or otherwise formed into shapes necessary for the particular apparatus in which they are employed. After the conductors are thus provided with the insulation, a coating or film of temporary protective material is applied which is characterized by the fact that it can be easily and completely removed from the conductors without injury to the insulation. The conductors are now wound into coils or formed into any desired shape. The protective coat is then removed leaving the conductors insulated with a film of inorganic insulation and spaced to receive a rigid permanent insulation. This further insulation is of an inorganic nature. The coil, for example, is provided in any suitable manner with suitable inorganic insulation material, which further coats the conductors and enters between turns of the coil, and which not only serves to protect the inorganic insulation previously applied but imparts additional heat resistance thereto.

My invention will be better understood by reference to the following detailed description thereof, its scope being pointed out in the appended claims.

The invention will be illustrated by describing the process employed in connection with the manufacture of an electrical coil as representative of a shaped electrical conductor.

An electrical conductor, for example a wire of copper, is provided with a coat of oxide in any suitable well-known manner. The insulated wire is now provided with a thin coat of alkyd resin. This may be accomplished by running the insulated wire through an enameling machine or by extruding a film of alkyd resin on the wire. Alkyd resins, as is well known, comprise those complexes resulting primarily from the interreaction of a polyhydric alcohol, such as glycerine, and a polybasic acid, such as phthalic acid or its anhydride, with or without other reacting ingredients. The film of resin protects the oxide film on the copper conductor against chipping or flaking and from being scraped off during the winding process which next takes place. A coil may thus be wound without injuring the oxide insulation film which is practically impossible to avoid during winding of a coil with conductors covered with oxide insulation alone. Alkyd resins may be obtained with varying degrees of flexibility; hence the alkyd resin protecting film is flexible in nature and will itself not crack or flake off during the coil winding process. It thus adequately protects the oxide film.

A characteristic of alkyd resins is that they volatilize with substantially no residue at a suitable elevated temperature. For example, at about 380°–400° C. the resin may be completely volatilized. Hence by simply baking the coil at this temperature for a suitable period of time, for example, about two hours, the resin film protecting the inorganic insulation is easily and completely removed. This leaves the inorganic insulating film intact and uninjured, and the wound coil is in position with spacing ready to receive further rigid and permanent insulation. Examples of solid inorganic insulation which may now be applied are the following: Mixtures of water glass, asbestos and flint; plaster of Paris;

magnesium oxychloride and other "hydraulic" cements; vitreous materials, such as mixtures of lead borate and mica, cast molten glass or vitreous enamels, and the like.

As an alternative material for the temporary spacing and protective coating a plastic material such as rubber, particularly unvulcanized rubber, possesses the desired properties for use in the process of the invention. The rubber may be applied to the insulated conductor in any suitable manner, for example by extrusion, dipping, etc. The dipping method appears to be preferable inasmuch as less rubber is deposited on the insulated wire and hence there is less rubber to remove after the coil is wound. Instead of heating to volatilize the temporary protective coating as when an alkyd resin is used, the rubber may be removed by dissolving it in hot aliphatic hydrocarbon solvents therefor, for example, by heating at about 220° C. in hot transil oil. The traces of oil remaining on the conductors may be removed by washing in solvents after which the coil is ready to receive its final rigid insulation as described above.

Alkyd resins and rubber are not only materials which may be employed as the temporary protective coat in the process of the invention. Other plastic and/or flexible materials which may be applied to the conductors to protect them during manipulation into their final shape and which may be removed without injury to the insulation may be employed. For example, metastyrene polymer may be used in place of alkyd resins and rubber and removed by heating the coated wire at about 400° C. for approximately two hours.

The initial inorganic insulation applied to the conductor need not be an oxide. It may be such a material as lead borate or other suitable inorganic insulation. Of course, the conductor need not be copper. Any suitable metal may be employed. For example, aluminum may be used and provided with an insulating coat comprising a film of aluminum oxide. Furthermore, a different oxide than that of the metal employed may be provided on the conductor; for example, a copper conductor may be provided with an insulating film of aluminum oxide in accordance with the process outlined in the Letters Patent to David Basch 1,637,033 dated July 26, 1927.

What I claim as new and desire to secure by Letters Patent of the United States is:

1. A process which comprises the steps of providing a metallic conductor with a coating of inorganic insulation, covering said inorganic insulation with a temporary protective coat of material which is removable without injury to said insulation, forming the conductor into a desired shape, removing said protective coat and applying another coating of inorganic insulation.

2. A process of providing an electrical coil with inorganic insulation which comprises insulating the metallic conductors from which the coil is to be formed, with inorganic insulation, coating the insulated conductors with an alkyd resin, forming the coil, removing said alkyd resin coat from the conductors, and impregnating the coil with additional inorganic insulation.

3. A process of providing an electrical coil with inorganic insulation which comprises insulating the metallic conductors from which the coil is to be formed, with inorganic insulation, coating the insulated conductor with an alkyd resin, forming the coil, heating the coil at about 380°–400° C. for about two hours, and impregnating the coil with additional inorganic insulation.

4. A process of providing an electrical coil with inorganic insulation which comprises providing a film of oxide on a metallic conductor, providing said conductor with a film of plastic material which is removable from said conductor without injury to the oxide film thereon, winding said conductor into a coil, removing the plastic coat, and providing said coil with a rigid inorganic insulation on and between the turns thereof.

5. In a process of forming an inorganically insulated electrical winding, the steps of providing electrical conductors, prior to the formation of the winding, with a coating of inorganic insulation and superposing on said coating a temporary protective coat of a material which is removable without injury to the inorganic insulation after the winding is formed.

6. In a process of forming an inorganically insulated electrical coil, the steps of providing electrical conductors, prior to winding them into a coil, with a coating of inorganic insulation and coating said inorganic insulation with a film of alkyd resin.

7. A process of providing an electrical coil with inorganic insulation which comprises coating the conductors from which the coil is to be formed with inorganic insulation, applying to said coated conductors a film of rubber, forming the coil, removing said rubber, and providing said coil with a rigid inorganic insulation on and between the turns thereof.

In witness whereof, I have hereunto set my hand.

ALMON G. HOVEY.